United States Patent
Maeda et al.

(10) Patent No.: US 7,248,804 B2
(45) Date of Patent: Jul. 24, 2007

(54) OPTICAL TRANSMISSION DEVICE USING A WIDE INPUT DYNAMIC RANGE OPTICAL AMPLIFIER

(75) Inventors: Taizo Maeda, Kawasaki (JP); Takehiro Fujita, Kawasaki (JP); Motoyoshi Sekiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 10/892,241

(22) Filed: Jul. 16, 2004

(65) Prior Publication Data

US 2006/0127101 A1    Jun. 15, 2006

(30) Foreign Application Priority Data

Mar. 9, 2004    (JP)    ............................. 2004-065052

(51) Int. Cl.
*H04B 10/16*    (2006.01)
(52) U.S. Cl. .................... 398/180; 398/26; 398/37; 398/177; 359/349
(58) Field of Classification Search ............... 398/26, 398/37, 177, 180; 359/349
See application file for complete search history.

(56) References Cited

U.S. PATENT DOCUMENTS

| 5,875,054 | A | * | 2/1999 | Onoda et al. ............ 359/341.2 |
| 6,434,286 | B2 |  | 8/2002 | Hayashi et al. |

FOREIGN PATENT DOCUMENTS

| JP | 1 049 274 | 11/2000 |
| JP | 2000-312185 | 11/2000 |
| JP | 2001-339344 | 12/2001 |

* cited by examiner

*Primary Examiner*—Leslie Pascal
(74) *Attorney, Agent, or Firm*—Staas & Halsey LLP

(57) ABSTRACT

Conventionally, an adjustment of an optical power level of an input Pin of an optical amplifier module is made with an optical variable attenuator. An optical coupler for measuring the optical power level of Pin and an optical variable attenuator are replaced by a variable optical coupler. The branch ratio of the variable optical coupler is varied, whereby the input optical power level Pin to an optical amplifier module is adjusted. As a result, an optical loss is reduced by an amount corresponding to the elimination of the optical attenuator, and also the OSNR of the optical amplifier module is improved.

9 Claims, 18 Drawing Sheets

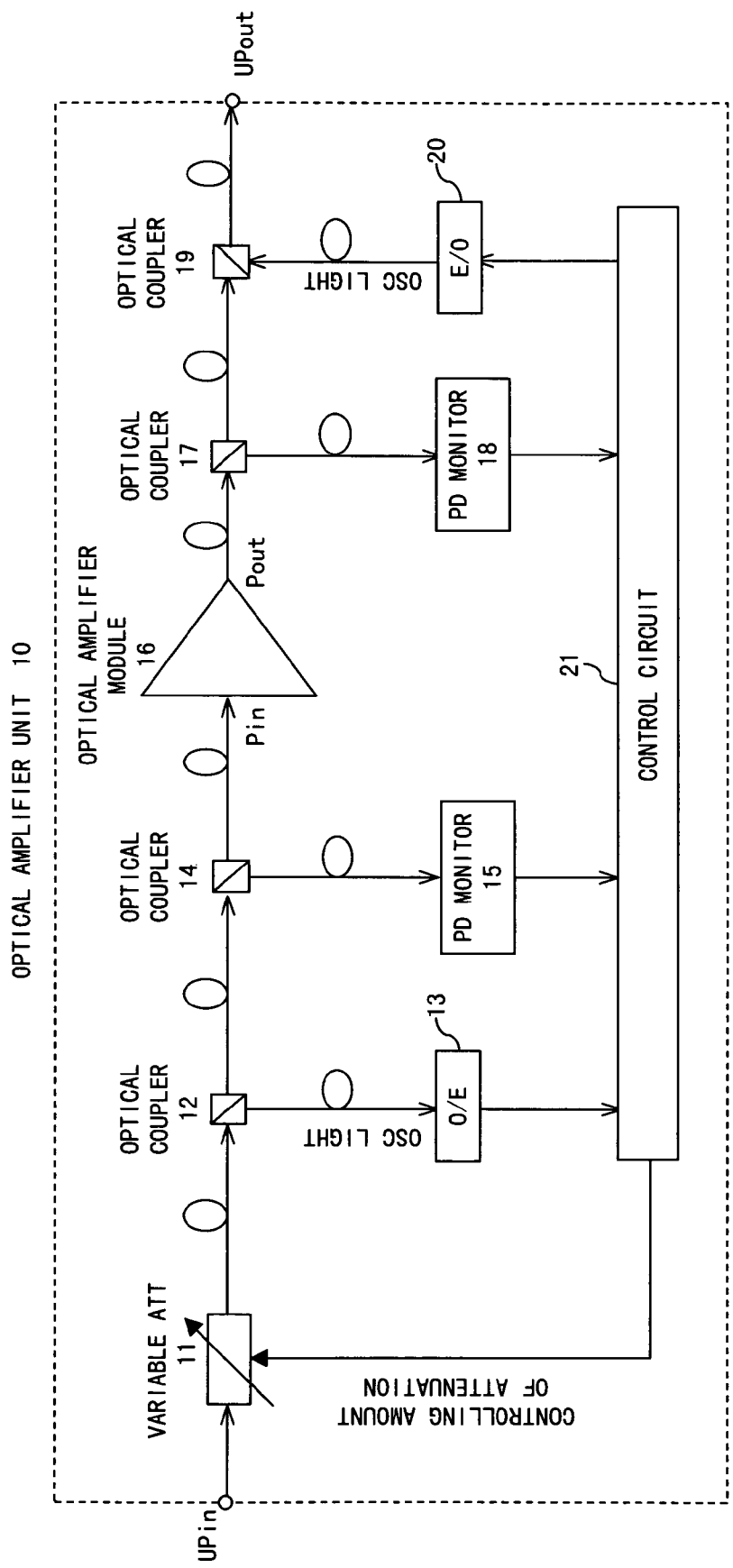
F I G. 2

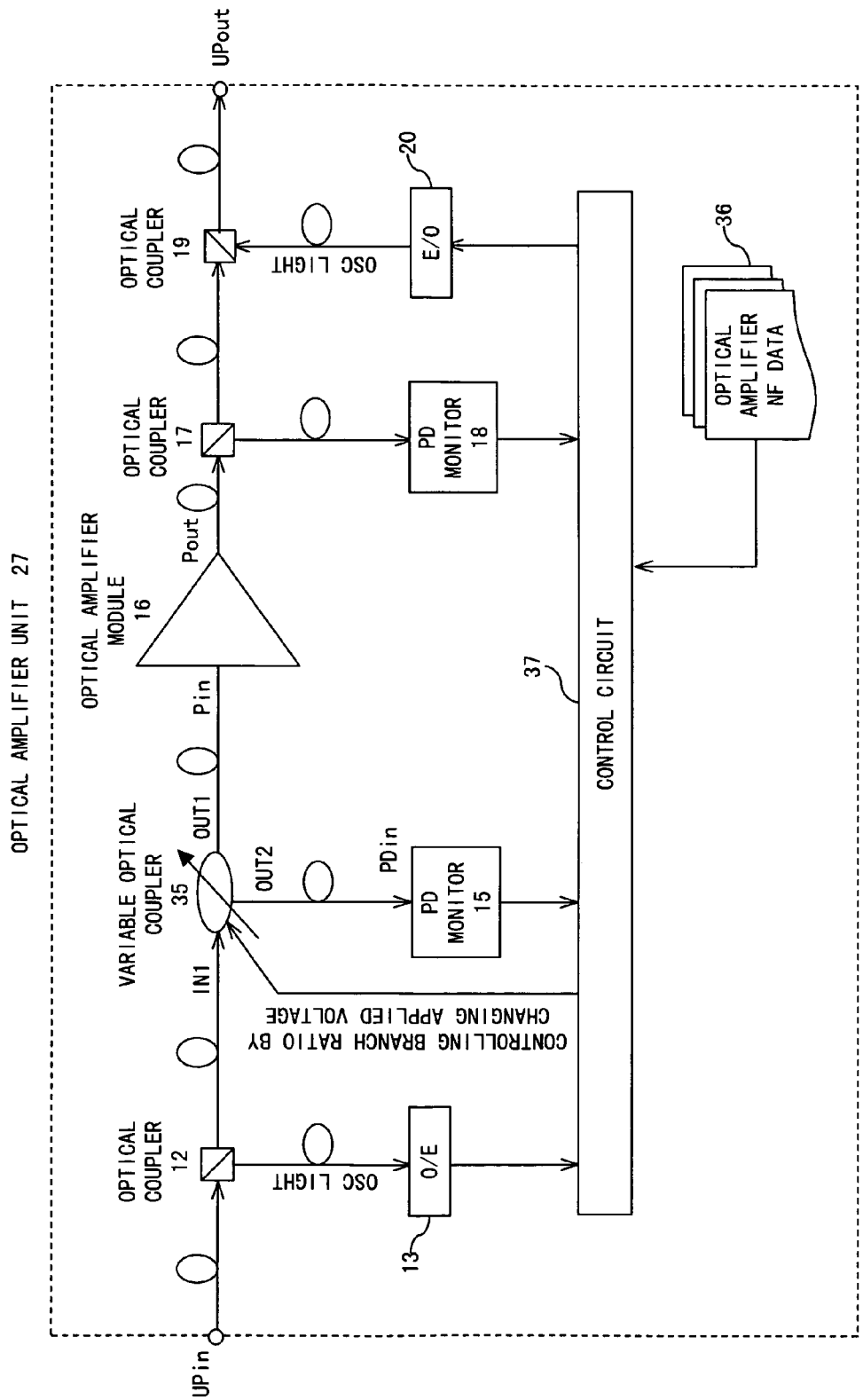
F I G. 5

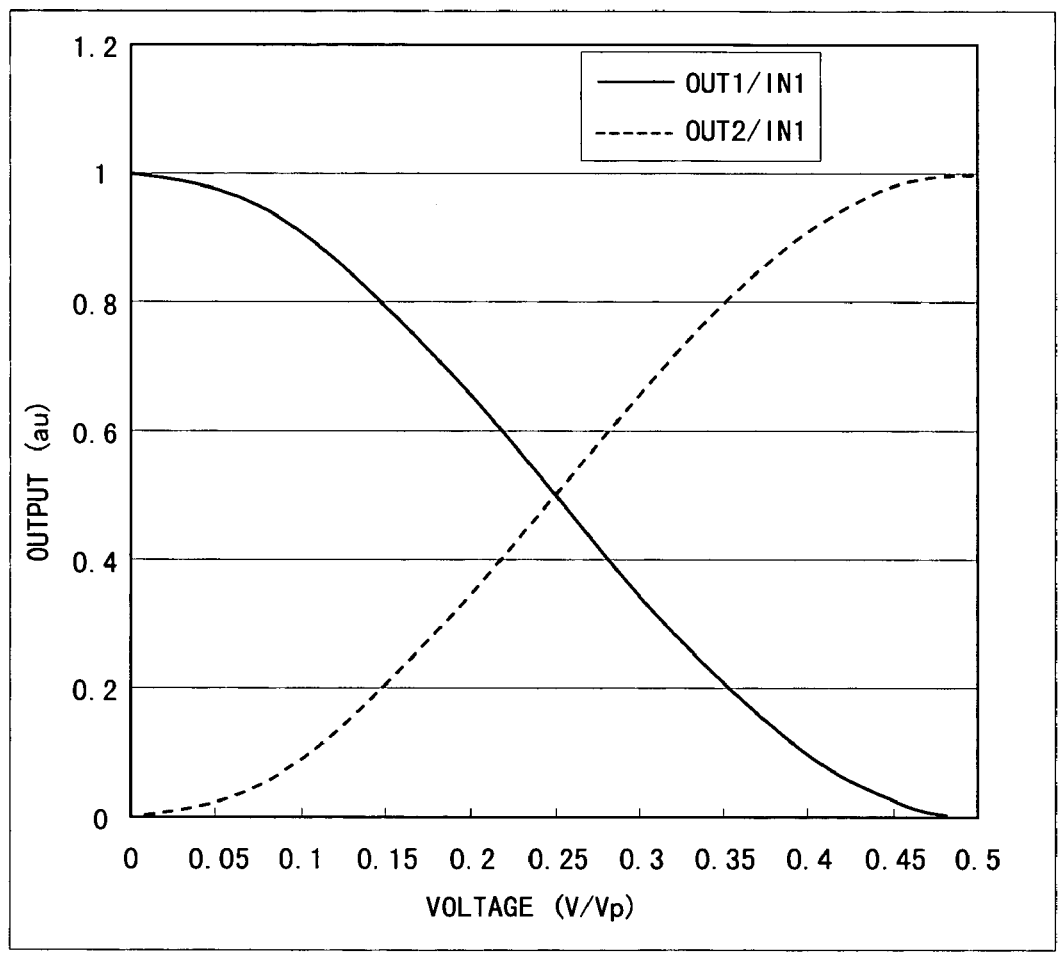
F I G. 7

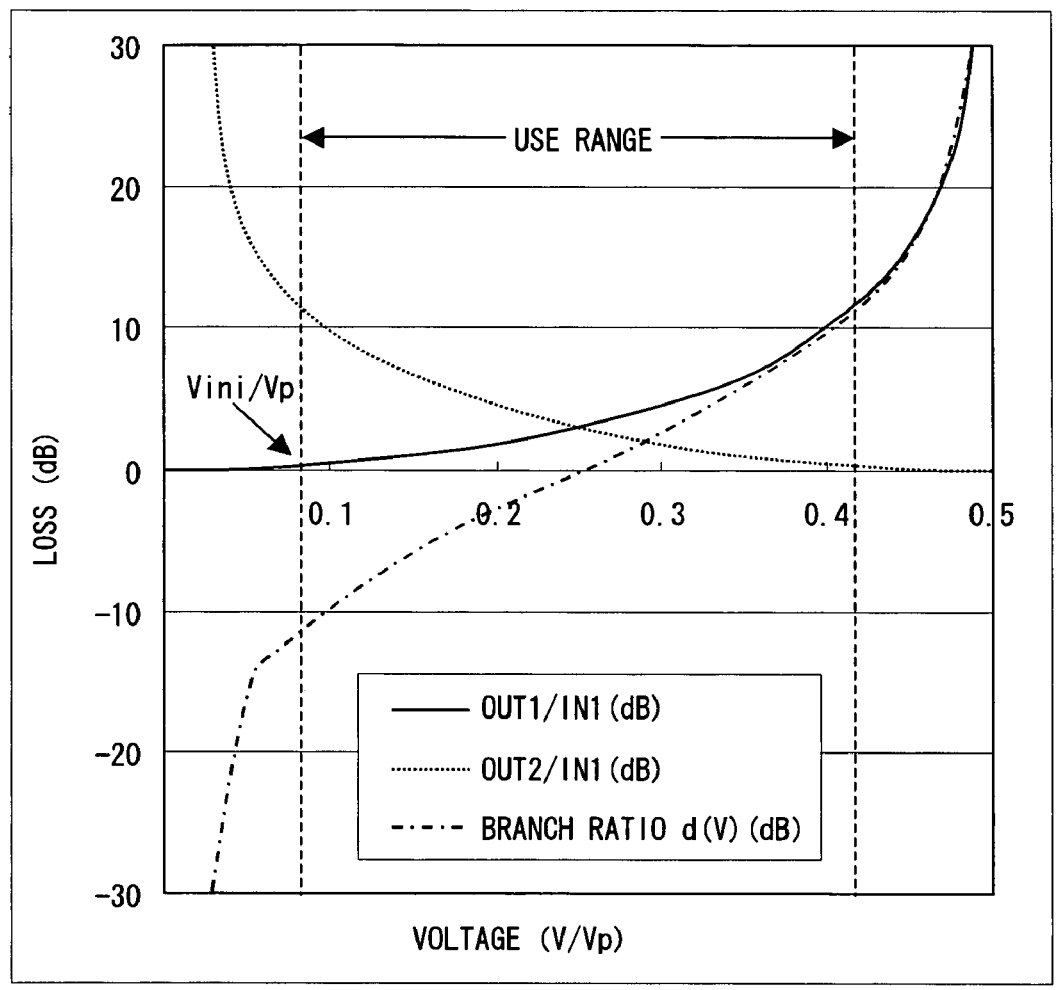
F I G. 8

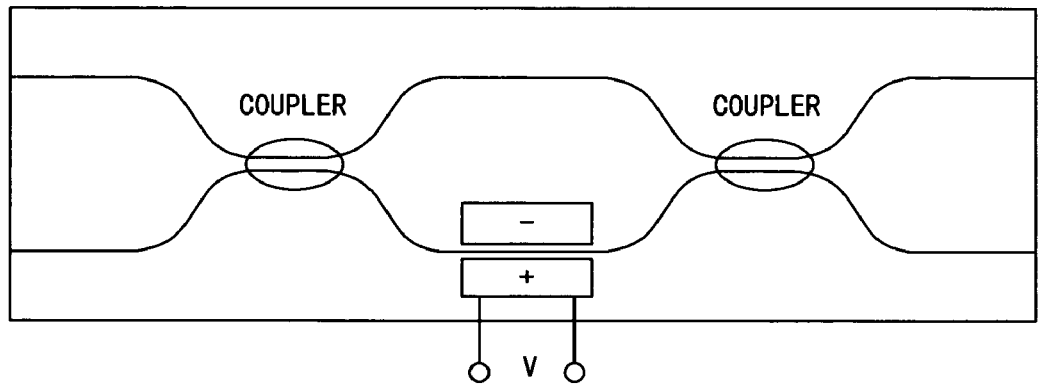
F I G. 1 2

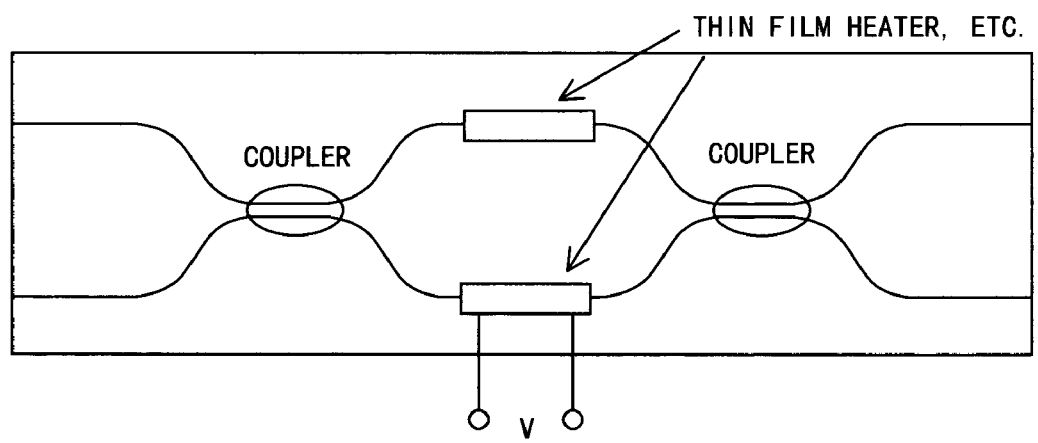
F I G. 1 3

TABLE 3

| Time | Upin | v | IN1 | OUT1 | OUT2 | PD(1) in | Pin | Pout | PD(2) in | Upout | Ptgt | Pin−Ptgt | a (V) | Δv |
|---|---|---|---|---|---|---|---|---|---|---|---|---|---|---|
| a.u. | dBm | V | dBm | dBm | dBm | dBm | dBm | dBm | dBm | dBm | dBm | dB | − | V |
| 1 | −19.8 | 0.083 | −20.4 | −21.0 | −32.5 | −32.5 | −21.0 | 3.0 | −10.6 | 1.8 | −22.5 | 1.5 | 0.0470 | 0.071 |
| 2 | −19.8 | 0.154 | −20.4 | −21.8 | −27.4 | −27.4 | −21.8 | 3.0 | −10.6 | 1.8 | −22.5 | 0.7 | 0.0268 | 0.020 |
| 3 | −19.8 | 0.173 | −20.4 | −22.1 | −26.5 | −26.5 | −22.1 | 3.0 | −10.6 | 1.8 | −22.5 | 0.4 | 0.0232 | 0.009 |
| 4 | −19.8 | 0.183 | −20.4 | −22.3 | −26.1 | −26.1 | −22.3 | 3.0 | −10.6 | 1.8 | −22.5 | 0.2 | 0.0215 | 0.005 |
| 5 | −19.8 | 0.188 | −20.4 | −22.3 | −25.8 | −25.8 | −22.3 | 3.0 | −10.6 | 1.8 | −22.5 | 0.2 | 0.0206 | 0.003 |
| 6 | −19.8 | 0.191 | −20.4 | −22.4 | −25.7 | −25.7 | −22.4 | 3.0 | −10.6 | 1.8 | −22.5 | 0.1 | 0.0200 | 0.002 |
| 7 | −19.8 | 0.193 | −20.4 | −22.4 | −25.6 | −25.6 | −22.4 | 3.0 | −10.6 | 1.8 | −22.5 | 0.1 | 0.0196 | 0.001 |
| 8 | −19.8 | 0.195 | −20.4 | −22.5 | −25.5 | −25.5 | −22.5 | 3.0 | −10.6 | 1.8 | −22.5 | 0.0 | 0.0194 | 0.001 |

F I G. 1 6

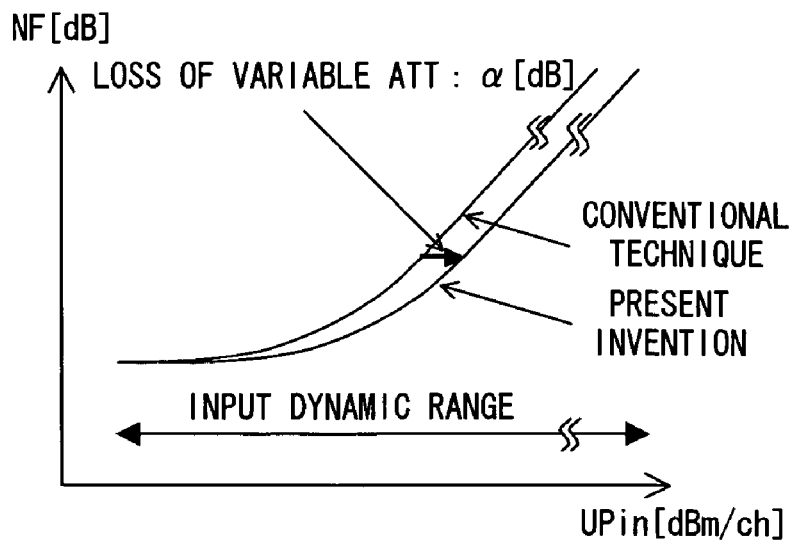
F I G. 1 8 A
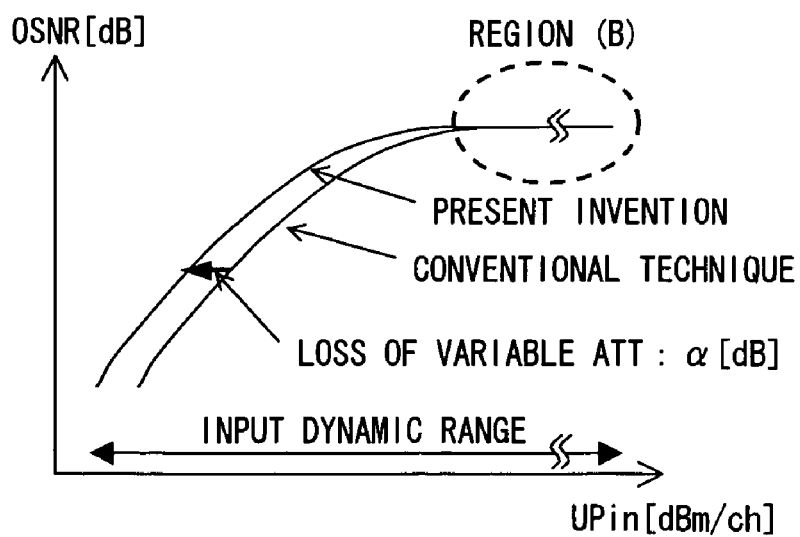
F I G. 1 8 B

OPTICAL TRANSMISSION DEVICE USING A WIDE INPUT DYNAMIC RANGE OPTICAL AMPLIFIER

BACKGROUND OF THE INVENTION

1. Field of the Invention

The present invention relates to an optical transmission device having an optical amplifier in a WDM (Wavelength Division Multiplexing) apparatus.

2. Description of the Related Art

FIGS. 1A and 1B explain a conventional technique.

Normally, a noise figure (hereinafter abbreviated to an NF) of an optical amplifier for WDM tends to increase with an increase in the input level of the amplifier if its output is made constant. FIG. 1A shows the state of an increase in the NF of an optical amplifier module. Pin is an input level of light input to the optical amplifier module, and indicates an optical intensity per channel. This figure indicates that the NF nonlinearly increases with an increase in Pin over the entire input dynamic range of the optical amplifier module. In the meantime, FIG. 1B indicates a relationship between Pin and an OSNR (Optical Signal-to-Noise Ratio). The OSNR exhibits an upward convex curve with an increase in Pin, and a point where the OSNR becomes a maximum exists. In the following description, an optical amplifier unit is a configuration of an entire optical amplifier module including an optical amplifier module, a control circuit adjusting the gain of the optical amplifier module, etc. Additionally, the optical amplifier module is part of an optical amplifier unit including a minimum configuration that is required to amplify an optical signal, and includes at least an optical amplification medium and a pumping light source.

Furthermore, since the wavelength dependence of a gain relies on the gain of an optical amplifier in a WDM transmission, the gain must be made constant. Eventually, it is difficult both to maintain a low NF, namely, to suppress occurring noise and reduce wavelength dependence, and to widely secure the input dynamic range of the optical amplifier.

Normally, spans having different losses coexist in an optical transmission system using optical amplifiers. Therefore, the input of an optical amplification relay can possibly take various values, and input level a wide range. Accordingly, to maximize the performance of the system, input levels in a wide range must be supported by preparing a plurality of types of optical amplifiers having input dynamic ranges of different levels, and by selecting an optimum type of an optical amplifier according to an input level. Furthermore, a span loss varies due to fluctuations in a temperature, etc. Besides, a span loss may vary due to a problem transfer (a line change for coping with a road construction, etc.), or the like. In such a case, a type of an optical amplifier must be changed, and a new component must be provided. On an already operated route, a type of an optical amplifier cannot be changed unless the operation is suspended.

As a method supporting a span loss in a wide range, a method adjusting an input level of an optical amplifier module to fall within the input dynamic range of the amplifier is considered. As a method adjusting an optical level, a method arranging a variable attenuator (hereinafter abbreviated to a variable ATT) prior to an optical amplifier module, combining the variable ATT with a monitor coupler for measuring an input level of an optical amplifier module, and with a PD monitor, and adjusting the optical level in order to make the input level of the module constant is considered.

FIG. 2 exemplifies the configuration of a conventional optical amplifier unit.

An optical amplifier unit 10 comprises: in addition to an optical amplifier module 16, a variable attenuator (variable ATT) 11 for adjusting the optical level of an input to the optical amplifier module 16; an optical coupler 12 for splitting and detecting OSC (Optical Supervisory Channel) light; an opto-electric converter 13; an optical coupler 14 and a PD monitor 15 for monitoring the input level of light input to the optical amplifier module 16; an optical coupler 17 and a PD monitor 18 for monitoring the output level of the optical amplifier module 16; an electro-optic converter 20 and an optical coupler 19 for coupling the OSC light to a main signal; and a control circuit 21 controlling the variable ATT 11.

In FIG. 2, the variable ATT 11, and the two optical couplers 12 and 14 exist between the input (UPin) of the optical amplifier unit 10 and the input (Pin) of the optical amplifier module 16, and losses in these optical components affect the OSNR (Optical Signal-to-Noise Ratio): optical N/S ratio) of the optical amplifier unit 10. The NF characteristic of the optical amplifier module/unit, and the OSNR characteristic of the optical amplifier module/unit are respectively shown in FIGS. 3A and 3B. If UPin exists in a region (A) of FIG. 3B, the gradient of the NF of the optical amplifier unit becomes approximately 0 dB/dB. At this time, the OSNR has a gradient of 1 dB/dB. If UPin decreases due to a loss, also the OSNR decreases by the amount of the decrease of UPin. Namely, since the loss and the OSNR make a one-to-one correspondence, losses in the above described optical components result in a deterioration in the OSNR. Accordingly, decreasing the losses as much as possible is required to improve the OSNR.

As conventional techniques, Patent Documents 1 and 2 exist. Patent Document 1 discloses a technique changing an optical input level in order to make an input level to an optical amplifier constant if an optical signal is disconnected. Patent Document 2 discloses a technique implementing a redundant configuration where hardware is shared by using an optical coupler whose branch ratio can be varied.

[Patent Document 1] Japanese Patent Application Publication No. 2000-312185

[Patent Document 2] Japanese Patent Application Publication No. 2001-339344

As described above, the OSNR of an output signal of the optical amplifier unit deteriorates due to losses in the optical components within the optical amplifier unit. Therefore, reducing the losses in the optical components as much as possible is effective if attempts are made to fully utilize the performance of the optical amplifier module.

SUMMARY OF THE INVENTION

An object of the present invention is to provide an optical transmission device comprising an optical amplifier, which can secure a wide input dynamic range, and can take a large OSNR.

An optical transmission device according to the present invention comprises: an optical amplifying unit amplifying an optical signal; a variable optical branching unit, whose branch ratio can be varied, branching an input to the optical amplifying unit, inputting one to the optical amplifying unit, and supplying another in order to measure an optical intensity; and a controlling unit detecting the optical intensity of the other branch by the variable optical branching unit, detecting the optical intensity input to the optical amplifying unit, adjusting the optical level input to the optical amplifying unit by controlling the branch ratio of the variable optical branching unit, and controlling a signal-to-noise ratio of the optical amplifying unit.

According to the present invention, the variable branching unit that can vary its branch ratio used to adjust an input level to the optical amplifying unit. Accordingly, an optical coupler having a conventional configuration, and a function of an optical attenuator can be comprised together, whereby an optical loss can be decreased by the amount of a loss in the optical attenuator, the OSNR of the optical amplifying unit can be improved, and a wide input dynamic range can be maintained as with a conventional technique.

According to the present invention, an optical transmission device having an optical amplifier, which can take a large OSNR while securing a wide input dynamic range, can be provided.

BRIEF DESCRIPTION OF THE DRAWINGS

FIG. 2 explains the conventional technique (No. 2);

FIG. 5 shows a configuration of an optical amplifier unit according to the preferred embodiment of the present invention;

FIG. 7 exemplifies a voltage-output characteristic of an optical variable coupler;

FIG. 8 exemplifies a voltage-loss characteristic and a branch ratio characteristic of an optical variable coupler;

FIG. 12 exemplifies a configuration (No. 1) of a variable optical coupler available for the preferred embodiment according to the present invention;

FIG. 13 exemplifies a configuration (No. 2) of a variable optical coupler available for the preferred embodiment according to the present invention;

FIG. 16 shows a table indicating value transitions from an initial state to a level adjustment termination when a process is executed by the device having the configuration shown in FIG. 4 according to the control flow shown in FIG. 6;

FIGS. 18A and 18B make a comparison between the performance of the preferred embodiment according to the present invention and that of the conventional technique.

DESCRIPTION OF THE PREFERRED EMBODIMENTS

Figure 4:
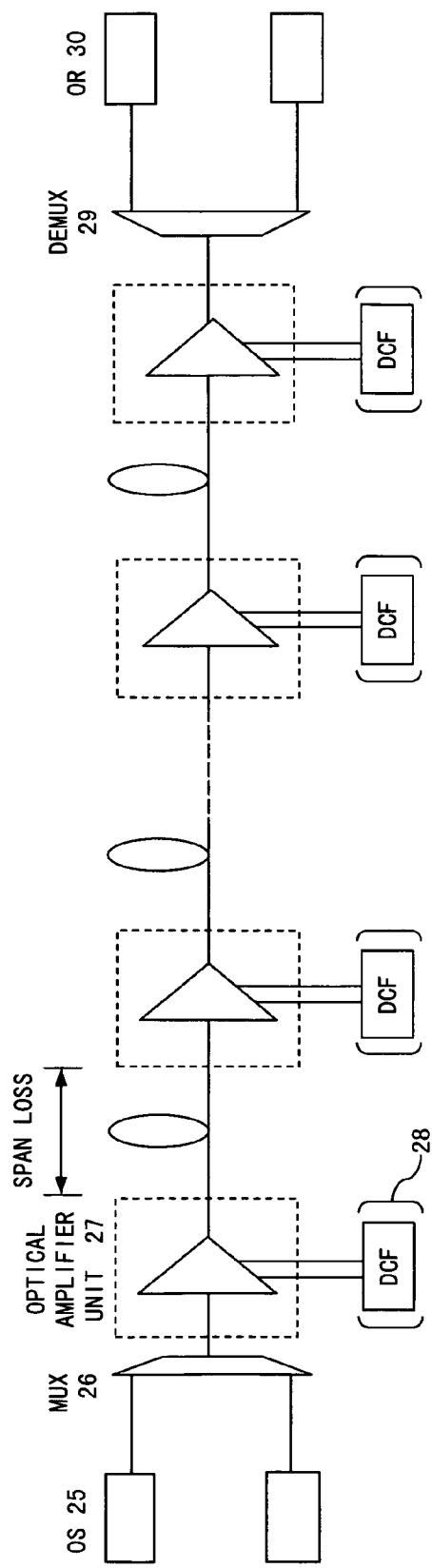
FIG. 4 shows a system configuration to which a preferred embodiment according to the present invention is applied.
Figure 6:
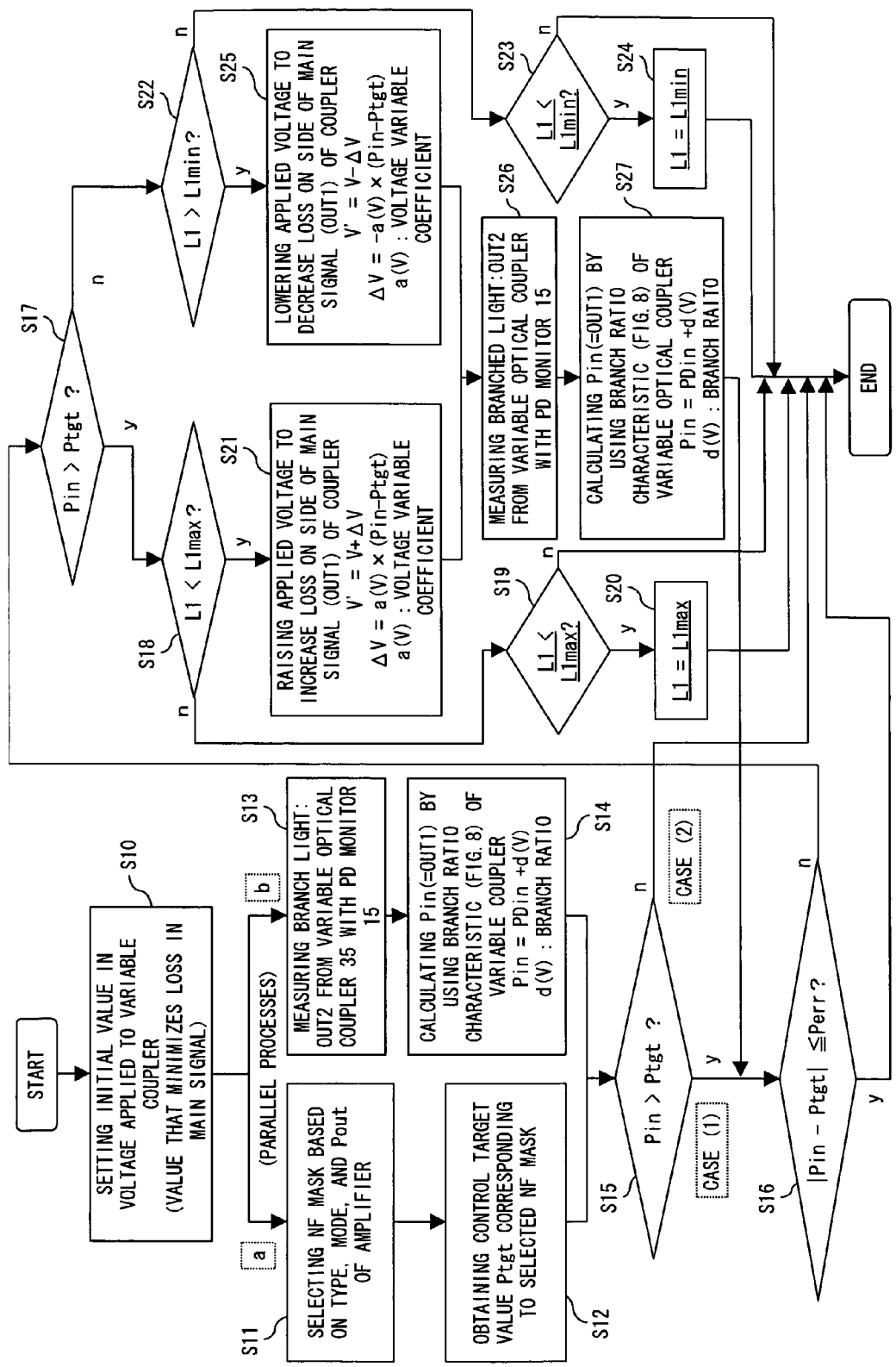
FIG. 6 shows a control flow according to the preferred embodiment of the present invention.

A system configuration to which a preferred embodiment according to the present invention is applied, the configuration of an optical amplifier unit according to the preferred embodiment of the present invention, and a control flow according to the preferred embodiment of the present invention are respectively shown in FIGS. 4, 5, and 6.

In FIG. 4, optical signals having respective wavelengths transmitted from an OS (Optical Sender) 25 are multiplexed by a multiplexer 26, and transmitted to a transmission line as an optical wavelength division multiplexed signal. Optical amplifier units 27 each comprising a DCF (Dispersion Compensation Fiber) 28 provided for wavelength dispersion are arranged at predetermined intervals on the transmission line configured by an optical fiber. An interval between optical amplifier units 27 is called a span, and an intensity loss in an optical signal, which occurs in one span, is called a span loss. The optical wavelength division multiplexed signal is demultiplexed into optical signals having respective wavelengths by a demultiplexer 29 on a receiving side, and received by ORs (Optical Receivers) 30 respectively arranged for the wavelengths.

In FIG. 5, the same constituent elements as those in FIG. 2 are denoted with the same reference numerals, and their explanations are omitted.

For the adjustment control of an optical input level to an optical amplifier module 16, a measurement value of a PD monitor 15 is used. A relationship between the optical input level to the optical amplifier module 16 and the measurement value of the PD monitor 15 depends on a branch ratio of a variable optical coupler 35. Therefore, a process for converting into the input level to the optical amplifier module 16 based on the branch ratio of the variable optical coupler 35 and the measurement value of the PD monitor 15 must be executed within a control circuit 37.

A voltage-output characteristic of the optical variable coupler, and a voltage-loss characteristic and a branch ratio characteristic of the optical variable coupler are respectively exemplified in FIGS. 7 and 8.

Here, OUT1 and OUT2 respectively indicate output levels in through and branch directions of the optical variable coupler. IN1 indicates an input level to the variable optical coupler, whereas V indicates a voltage applied to the variable optical coupler.

FIG. 7 depicts a state where the intensities of the sides of OUT1 and OUT2 continuously vary with a change in the voltage. As is known from this figure, variations in the intensities of the OUT1 and the OUT2 are not always linear. FIG. 8 depicts the voltage-loss characteristic of the variable coupler. It is proved in this figure that loss increases with an increase in the branch ratio. Accordingly, the variable optical coupler is actually used in a range indicated as a "use range" in FIG. 8.

In a preferred embodiment according to the present invention, the branch ratio of the variable optical coupler 35 is varied, OUT2 is monitored with the PD monitor 15, and the value of OUT1 is calculated from OUT2 by using the branch ratio characteristic within the control circuit 37. Specifically, a branch ratio characteristic table is comprised as a database within the control circuit 37. The branch ratio characteristic table is exemplified by Table 1.

TABLE 1

| applied voltage (V/Vp) | branch ratio (OUT1/OUT2) | |
|---|---|---|
| | dB | antilog |
| 0.05 | 16.0 | 39.86 |
| 0.10 | 9.8 | 9.47 |
| 0.15 | 5.9 | 3.85 |
| 0.20 | 2.8 | 1.89 |
| 0.25 | 0.0 | 1.00 |
| 0.30 | −2.8 | 0.53 |
| 0.35 | −5.9 | 0.26 |
| 0.40 | −9.8 | 0.11 |
| 0.45 | −16.0 | 0.03 |

OUT1, namely, Pin is calculated based on OUT2 (Namely, PDin of FIG. 5), and a relationship between an applied voltage and a branch ratio (Table 1). Note that the branch ratio characteristic is calculated with linear interpolation.

Control is performed so that the above obtained input level Pin to the optical amplifier module 16 matches a control target value Ptgt within the input dynamic range of the amplifier. Here, if the control target value Ptgt is within the input dynamic range of the optical amplifier module 16, a transmission can be made. However, to improve the performance of the system, Ptgt must be set to make the OSNR optimum.

For this reason, an optimum input level is calculated. The control circuit 37 comprises a database of NF values of the optical amplifier module 16. The NF values are stored as a table of Pin versus NF (hereinafter referred to as an NF mask). The NF masks are exemplified in Table 2.

TABLE 2

| Pout [dBm/ch] | Pin [dBm/ch] | NF [dB] | Ptgt | Pin [dBm/ch] | NF [dB] | Ptgt |
|---|---|---|---|---|---|---|
| | EDFA01 | | | EDFA02 | | |
| +3.0 | −25.0 | 8.0 | −22.5 | −23.0 | 8.5 | −21.4 |
| | −24.0 | 8.5 | | −22.0 | 9.5 | |
| | −23.0 | 9.0 | | −21.0 | 10.0 | |
| | −22.0 | 10.0 | | −20.0 | 11.0 | |
| | −21.0 | 11.5 | | −19.0 | 12.5 | |
| | −20.0 | 14.0 | | −18.0 | 15.0 | |
| +2.0 | −25.0 | 8.5 | −22.4 | −23.0 | 9.0 | −21.3 |
| | −24.0 | 9.0 | | −22.0 | 10.0 | |
| | −23.0 | 9.5 | | −21.0 | 10.5 | |
| | −22.0 | 10.5 | | −20.0 | 11.5 | |
| | −21.0 | 12.0 | | −19.0 | 13.0 | |
| | −20.0 | 14.5 | | −18.0 | 15.5 | |
| | EDFA03 | | | EDFA04 | | |
| +3.0 | −21.0 | 9.0 | −20.5 | −19.0 | 9.5 | −19.5 |
| | −20.0 | 10.5 | | −18.0 | 11.5 | |
| | −19.0 | 11.0 | | −17.0 | 12.0 | |
| | −18.0 | 12.0 | | −16.0 | 13.0 | |
| | −17.0 | 13.5 | | −15.0 | 14.5 | |
| | −16.0 | 16.0 | | −14.0 | 17.0 | |
| +2.0 | −21.0 | 9.5 | −20.4 | −19.0 | 10.0 | −19.4 |
| | −20.0 | 11.0 | | −18.0 | 12.0 | |
| | −19.0 | 11.5 | | −17.0 | 12.5 | |
| | −18.0 | 12.5 | | −16.0 | 13.5 | |
| | −17.0 | 14.0 | | −15.0 | 15.0 | |
| | −16.0 | 16.5 | | −14.0 | 17.5 | |

In Table 2, EDFA01 to EDFA04 indicate the types of optical amplifier modules, and +3.0 and +2.0 of Pout indicate different modes of the optical amplifier modules, which give different output power levels. NF values not shown in Table 2 are calculated with linear interpolation. Additionally, since the NF value of an optical amplifier module varies by an output power level, NF masks are prepared for a plurality of modes depending on the value of the output power of an optical amplifier.

The OSNR of an optical amplifier unit is represented by an equation (1).

$$OSNR = Pin - NF - 10 \log(h\nu\Delta f) \quad (1)$$

where the OSNR (dB) is an optical S/N ratio of the optical amplifier unit, Pin (dBm/ch) is an input level to the optical amplifier module, $\Delta f$ (Hz) is an ASE light bandwidth, h (Js) is a Planck's constant, and $\nu$ (Hz) is an optical frequency.

Here, Pin that maximizes the OSNR of the optical amplifier unit is considered. From the equation $$\frac{dOSNR}{dPin} = 1 - \frac{dNF(Pin)}{dPin} \quad (2)$$

From the equation (2)

$$\frac{dNF(Pin)}{dPin} = 1 \quad (3)$$

Pin at this time is defined as a control target value of the input power level to the optical amplifier module. As a result, a point at which the gradient of an NF curve becomes 1 is proved to be the control target value Ptgt.

In this way, the control target value can be obtained. A calculation of the target value results in a fixed value for each NF mask. Therefore, the target value is calculated beforehand for the process executed by the control circuit 37, and the value is recorded to an NF mask table 36.

The control circuit 37 selects a corresponding NF mask based on the type, the mode, and the output power level of an optical amplifier module, and obtains an NF value and a control target value.

In this way, the control target value Ptgt, and the input level Pin to the optical amplifier module are obtained. Then, control for adjusting Pin to Ptgt is performed. The control for adjusting Pin to the target value is broadly classified into the following two patterns.

Case (1) (Pin>Ptgt): Control for adjusting Pin to Ptgt is performed with the optical variable coupler 35.

Case (2) (Pin<Ptgt): Control for adjusting Pin to a target value cannot be performed since Pin is smaller than Ptgt. In this case, control is performed to minimize a loss in the optical variable coupler.

A specific control method is represented by a control flow shown in FIG. 6. The flow of the control is described according to the control flow shown in FIG. 6.

First of all, a value that minimizes a loss in the main signal is set in the voltage applied to the variable coupler in step S10. Next, the following parallel processes are executed.

a. An NF mask is selected based on the type, the mode, and Pout of the optical amplifier module (step S11), and a corresponding control target value Ptgt that makes the OSNR optimum is obtained (step S12).

b. Light OUT2 branched from the variable coupler is monitored (step S13), and Pin is calculated (step S14).

Next, whether or not Pin is larger/smaller than Ptgt (step S15). If Pin<Ptgt (the above described case (2), the voltage applied to the optical variable coupler 35 is left to be an initial value (loss in the main signal: minimum), and the level adjustment of Pin is terminated. If Pin>Ptgt (the above described case (1)), the flow goes to the following process.

Next, it is verified if Pin and Ptgt match (step S16). Here, Perr is defined as a tolerable error margin from the adjustment target value of Pin. This defines a tolerable control deviation from Ptgt. If the following conditional expression is satisfied, Pin is recognized to be within the tolerable error margin, and the level adjustment of Pin is terminated.

$$|Pin-Ptgt| \leq Perr \qquad (4)$$

In other cases, a comparison of whether Pin is larger/smaller than Ptgt is made (step S17).

If Pin>Ptgt, it is determined whether or not a transmission loss L1 on the side of the main signal of the variable optical coupler 35 is smaller than its maximum value L1 max (step S18). If a result of the determination made in step S18 is "NO", it is further determined whether or not L1 is larger than L1 max in step S19. If L1 is not larger than L1 max, the process is terminated. This is because the level correction cannot be further made if the transmission loss on the side of the main signal of the variable coupler becomes a maximum. If L1 is larger than L1 max, the process is terminated after setting L1=L1 max in step S20.

If the determination made in step S18 is "YES", the applied voltage is raised to increase the loss on the side of the main signal (OUT1) of the coupler (step S21). At this time, the voltage-loss characteristic of the variable coupler significantly varies by a voltage value as shown in FIG. 8. Therefore, the amount of increase in the applied voltage is varied by the voltage value so that a change in the loss becomes constant. Namely, assuming that the amount of a change in the applied voltage is $\Delta V$, $\Delta V=a\,(V) \times (Pin-Ptgt)$ is set. That is, an applied voltage value $V'=V+\Delta V$ such that a change in the loss becomes constant by a voltage variable coefficient a(V) which varies with the value V of the applied voltage. Then, the flow goes to step S26.

If the determination made in step S17 is "NO", namely, if Pin<Ptgt, it is determined in step S22 whether or not L1 is larger than the minimum value of L1. If a result of the determination made in step S22 is "NO", it is determined in step S23 whether or not L1 is smaller than L1 min. If L1 is not smaller than L1 min, the process is terminated. This is because the level correction cannot be further made if the transmission loss on the side of the main signal of the variable coupler is the minimum. If L1 is smaller than L1 min, the process is terminated after setting L1=L1 min in step S24.

If the result of the determination made in step S22 is "YES", the applied voltage is lowered to decrease the loss on the side of the main signal (OUT1) of the coupler in step S25. Namely, the amount of an increase in the applied voltage is varied by the voltage value so that a change in the loss becomes constant, in a similar manner as in the case of Pin>Ptgt. Specifically, $\Delta V$ is set as $\Delta V=-a(V) \times (Pin-Ptgt)$ by using a voltage variable coefficient a (V), and its applied voltage after being changed V' is obtained with $V'=V+\Delta V$. Then, the flow goes to step S26.

In step S26, light OUT2 branched from the variable optical coupler 35 is measured with the PD monitor 15, and Pin (=OUT1) is calculated by using the branch ratio characteristic (shown in FIG. 7) of the optical variable coupler 35 in step S27. In this case, the calculation is made based on the following equation by defining d(V) as the branch ratio.

$$Pin=PDin+d(V)$$

After step S27, the flow goes back to step S16, and the control is repeated.

As a result of the above described processes, the level of Pin is adjusted to an optimum value.

Figure 9:
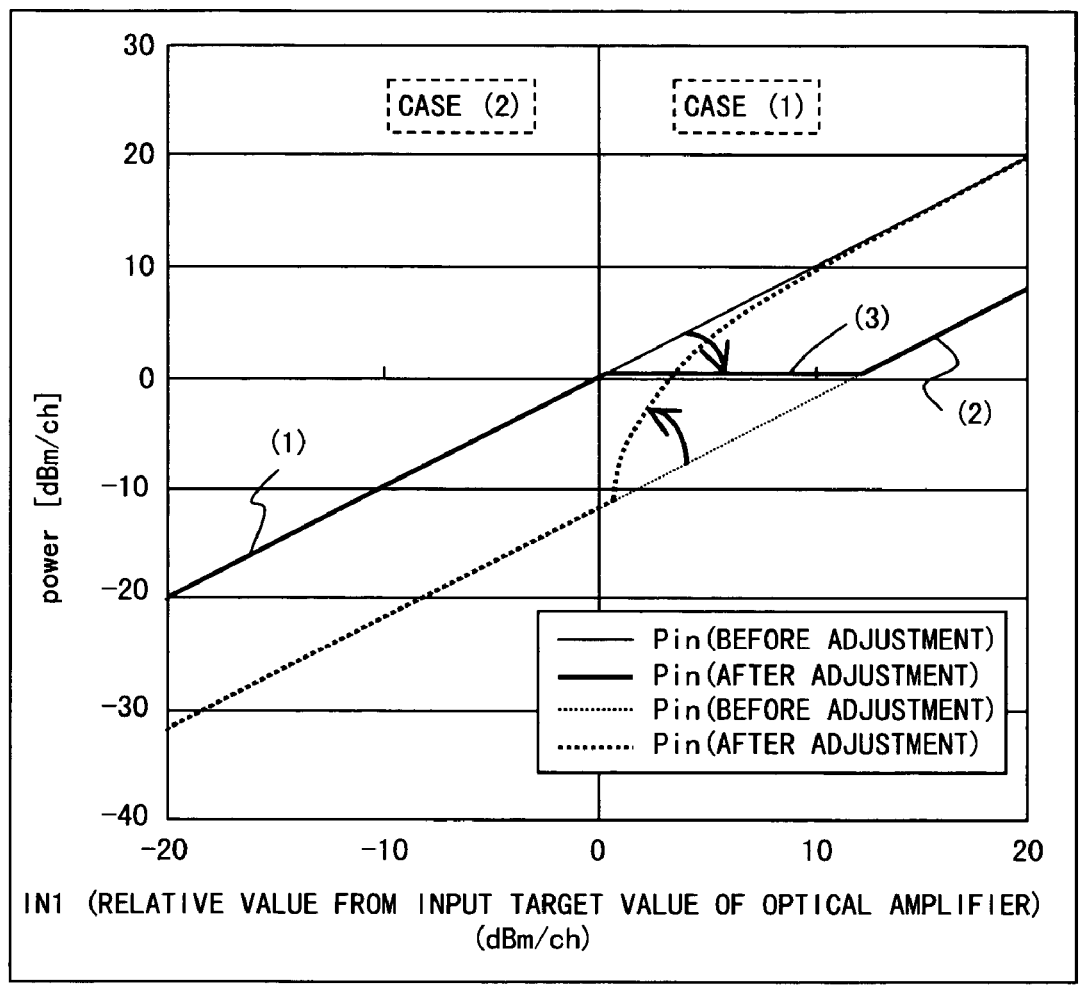
FIG. 9 shows the input level characteristics of an optical amplifier module and a PD when an input of the optical amplifier module is controlled.

FIG. 9 shows the input level characteristics of the optical amplifier module and the PD when the input of the optical amplifier module is controlled.

Figure 10:
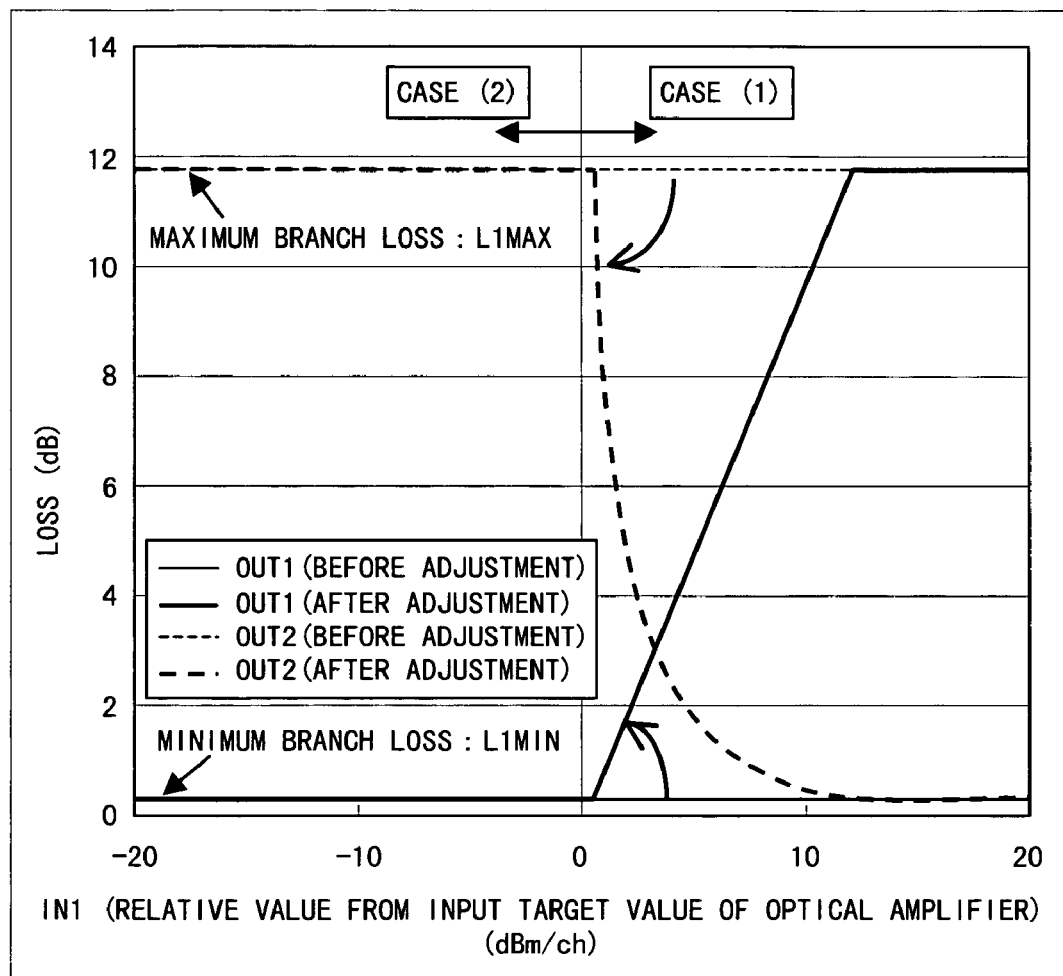
FIG. 10 shows a loss characteristic of a variable optical coupler.

As shown in FIG. 9, the input level (Pin shown in FIG. 5) to the optical amplifier module 16 is held to be a target value by controlling the branch ratio of the variable optical coupler 35. The loss characteristic of the variable optical coupler at this time is shown in FIG. 10.

In FIG. 9, Pin that initially varies along a line (1) is held to be a constant value when reaching a portion (3), transfers to (2) at a point at which the constant value and the minimum value of Pin match, and further rises. In FIG. 10, OUT1 is a minimum branch loss L1 min. OUT1 is then controlled until it linearly becomes a maximum branch loss from a point where IN1 becomes 0 dBm/ch. If IN1 reaches the maximum branch loss, this value is held. In the meantime, OUT2 is a maximum branch loss, then linearly decreases, and reaches a minimum branch loss.

Figure 11:
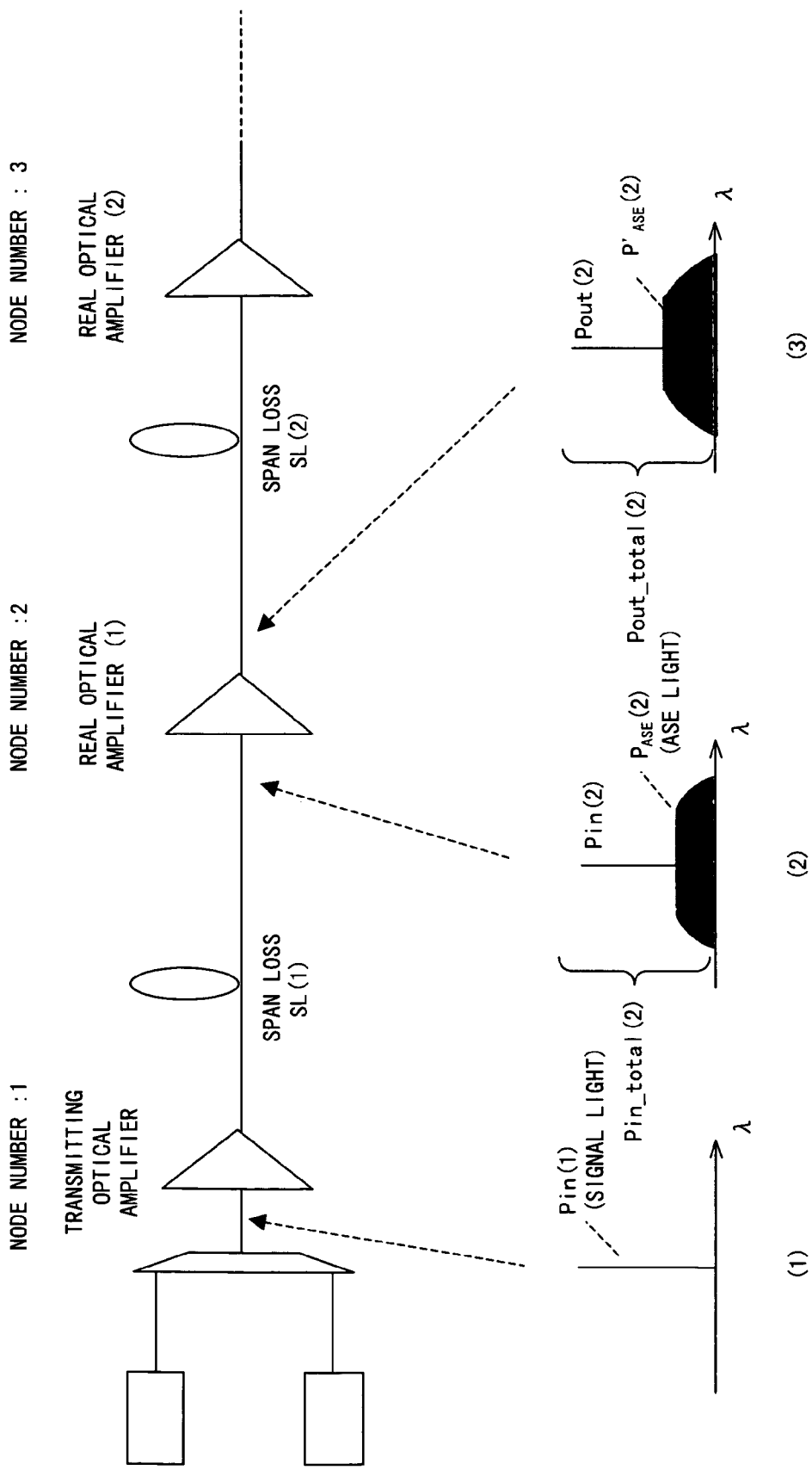
FIG. 11 shows the states of signal light and ASE light in a transmission system.

States of signal light and ASE light in the transmission system are shown in FIG. 11.

With the above described method, there are no problems if the system is a system where the OSNR is large (the amount of occurrence of ASE is small), or if the number of wavelengths is large. However, an occurrence of a measurement error of an optical level due to ASE becomes problematic if the system is a system where the OSNR is small, or the number of wavelengths is small. This is because the measurement value (a total value of signal light and ASE light) of the PD monitor is used to measure Pin. If the number of wavelengths is small or the amount of occurrence of ASE is large, an error caused by ASE light becomes problematic. Specifically, the level measured by the PD monitor 15 shown in FIG. 5 includes ASE light that occurs within the optical amplifier in addition to the main signal. In the meantime, an NF mask that the optical amplifier unit normally possesses is stipulated for the power of signal light. Accordingly, if the value measured by the PD15 is used for control, an error occurs from the input level of the optical amplifier, at which the OSNR becomes an optimum value, because an accurate NF value is not referenced.

According to the preferred embodiment of the present invention, an optical amplifier unit in a relay and a receiving station, which has one or more optical amplifier units on an upstream side, receives information about ASE power on the output end of the preceding optical amplifier module on the upstream side, and calculates the power of signal light whose error caused by ASE is corrected based on the received information, and the total input power measured by the PD 15.

To convey the amount of occurrence of ASE, an OSC (Optical Supervisory Channel), which is a channel for supervisory control, is used. As shown in FIG. 5, OSC light is captured by the optical coupler 12, and information about the amount of occurrence of ASE is obtained. Furthermore, the amount of ASE that occurs within the optical amplifier module is calculated, and the calculated amount is conveyed to the succeeding optical amplifier on a downstream side by using OSC light.

Normally, the amount of occurrence of ASE is calculated with an equation (5).

$$P_{ASE}=10\,\log(NFh\nu(G-1)B_{ASE}) \qquad (5)$$

where G is an amplification gain for the signal light, NF is a noise figure of the optical amplifier module, h (Js) is a Planck's constant, ν (Hz) is an optical frequency, $B_{ASE}$ (Hz) is an ASE light bandwidth.

Here, the NF in the equation (5) is a function of Pin (hereinafter referred to as NF(Pin)). For Pin, a value obtained by subtracting ASE light from the value measured by the monitor PD15 shown in FIG. 5 must be used. This calculation is made sequentially from a transmitting optical amplifier according to the following procedures.

In FIG. 11, an occurrence of ASE light caused by the optical amplifier module does not exist in the input of the optical amplifier unit in a node 1 ((1) shown in FIG. 11). Therefore, a correction considering the ASE is not made, and the value of the monitor PD15 is set to Pin. Next, NF(Pin) is obtained with an NF mask, and $P_{ASE}(1)$ is calculated with the equation (5) (variables in respective nodes are hereinafter referred to as $P_{ASE}(1)$, $P_{ASE}(2)$, ... by using node numbers 1, 2, 3, ... ). Next, considering the input ((2) of FIG. 11) of a relay optical amplifier (1) in a node 2, ASE caused by the upstream optical amplifier is included. Therefore, the amount of ASE in the input of the optical amplifier in the node 2 is calculated from $P_{ASE}(1)$ obtained with OSC in consideration of a deterioration in a span loss. In this case, an equation (6) is used.

$$P_{ASE}(2) = P_{ASE}(1) - SL(1) \quad (6)$$

where SL (dB) is a span loss.

In this way, an input level Pin(2) from which the ASE in the relay optical amplifier (1) in the node 2 is excluded can be calculated with an equation (7) by using Pin_total (2) (the measurement value in the PD 15 shown in FIG. 5).

$$Pin(2) = Pin\_total(2) - P_{ASE}(2) \quad (7)$$

NF(Pin) is obtained by using Pin(2) acquired with the equation (7), and $P_{ASE}(2)$ is obtained with the equation (5). This value is conveyed to the succeeding downstream optical amplifier by using OSC.

Thereafter, these operations are repeated by the relay optical amplifiers (2), (3), ... , whereby Pin(n) from which the amount of ASE is excluded can be obtained from the power of the optical amplifier input Pin_total (n) (n: node number), which is measured with the PD (PD 15 shown in FIG. 5), in each of the nodes. In this way, Pin(n) from which the amount of ASE is excluded is used in the control of the input level of the optical amplifier, at which the OSNR becomes optimum, whereby a measurement error caused by ASE is corrected, and the OSNR can be optimized.

FIGS. 12 to 15 exemplify configurations of the variable optical coupler available for the preferred embodiment according to the present invention.

A coupler (shown in FIG. 12) that has a configuration of a Mach-Zehnder interferometer and uses electro-optic effects is considered to be applied as the variable optical coupler. Electro-optic effects are effects by which a refractive index changes with an application of a voltage. With these effects, the refractive index of an optical path (optical path length) is changed as shown in FIG. 12. As a result, an interference state can be changed, and the branch ratio can be varied.

A variable optical coupler having a configuration of a Mach-Zehnder interferometer using thermo-photo effects instead of electro-optic effects may be available. By changing the refractive index with an increase/decrease in a temperature as shown in FIG. 13, the branch ratio is changed, and a level adjustment to a target value is made. As a method changing a temperature, a method using a thin film heater, a Peltier element, etc. is considered.

Figure 14:
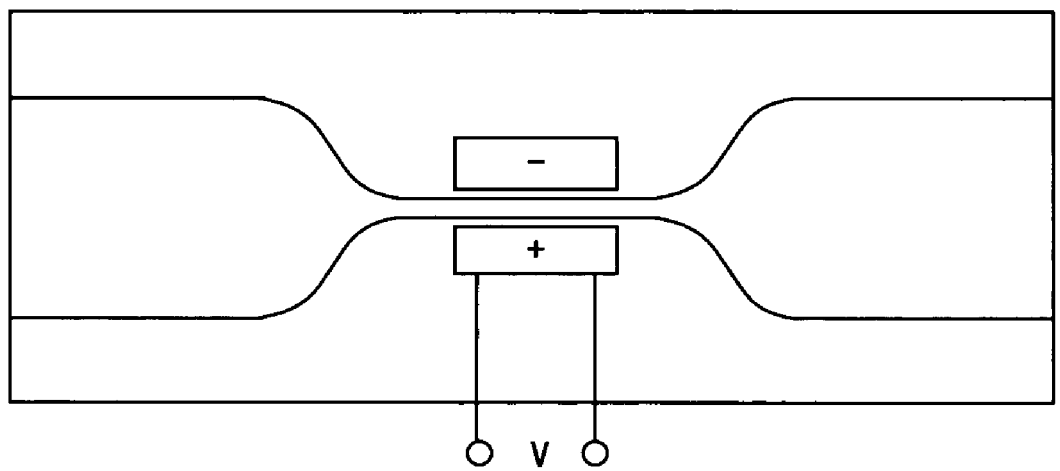
FIG. 14 exemplifies a configuration (No. 3) of a variable optical coupler available for the preferred embodiment according to the present invention.

Additionally, a coupler that branches optical power by making the cores of two optical fibers close, and by causing the coupling of the modes of the optical fibers is considered. The branch ratio can be changed by a distance (coupling length) at which the cores are made close. A variable optical coupler that adjusts the branch ratio of optical power by using electro-optic effects, and by changing the refractive index of an optical path to alter the optical path length as shown in FIG. 14 is used.

Figure 15:
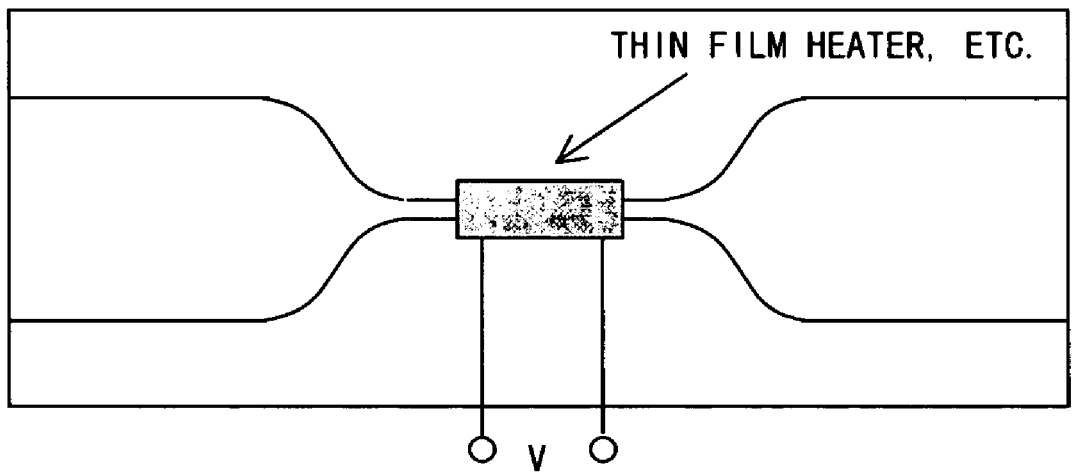
FIG. 15 exemplifies a configuration (No. 4) of a variable optical coupler available for the preferred embodiment according to the present invention.

Additionally, as the variable coupler using the mode coupling, a coupler using not electro-optic effects but thermo-photo effects may be available. As shown in FIG. 15, a variable optical coupler that adjusts the branch ratio by changing a temperature with a thin film heater, a Peltier element, etc. to change the refractive index of the optical path is used.

In addition to the above described variable optical couplers, a coupler using MEMS (Micro Electro Mechanical Systems) may be available. The MEMS is a micro device implemented by integrating electronic and mechanical mechanisms on one substrate by using semiconductor manufacturing technology. With the MEMS, an optical coupler whose branch ratio can be varied is configured with a voltage control, etc. by using a minimal movable mirror, etc. Also a variable optical coupler using such MEMS is available for the preferred embodiment according to the present invention.

Specific examples of numerical values are provided below.

(1) a transition of an optical level in the preferred embodiment according to the present invention condition: optical amplifier mode: EDFA01 (see Table 2), Vini=0.083V, Pout: +3.0 dBm/ch, Perr: 0.1 dB, L1max: 12.1 dB, L1min: 0.6 dB, a one-wavelength transmission optical amplifier type: EDFA01, Ptgt=−22.5 dBm/ch from Pout=+3.0 dBm/ch based on Table 2

Value transitions from an initial state to a level adjustment termination when the process is executed by the device having the configuration shown in FIG. 4 according to the control flow shown in FIG. 6 are shown in Table 3 of FIG. 16.

The above described preferred embodiment is described by assuming that the branch ratio of the variable optical coupler is automatically controlled. However, the branch ratio may not be always controlled automatically, and can be manually controlled.

Figure 17:
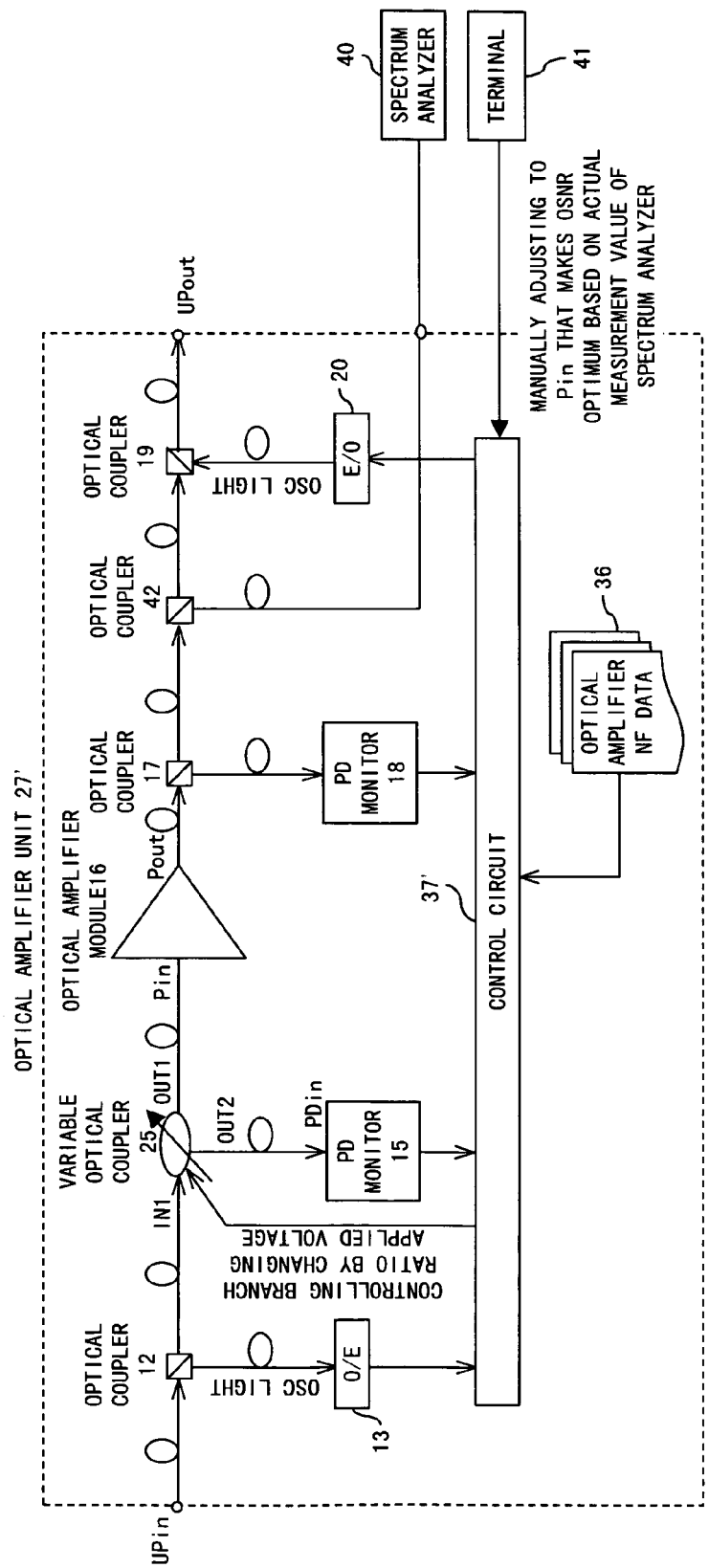
FIG. 17 shows a configuration of an optical amplifier unit for manually varying a branch ratio of a variable optical coupler, and for optimally maintaining an OSNR.

FIG. 17 shows the configuration of the optical amplifier unit, in which the branch ratio of the variable optical coupler is manually varied to hold the OSNR optimum. In this figure, the same constituent elements as those shown in FIG. 5 are denoted with the same reference numerals, and their explanations are omitted.

As the above described adjustment of an optical level to an OSNR optimum value, a manual adjustment of the input of the optical amplifier module may be made to make the optical S/N optimum by adding an optical coupler 42 to the output of the optical amplifier module 16, by connecting a spectrum analyzer 40, etc. to the optical coupler 42, and by actually measuring an output spectrum. The input of the manual adjustment is made from a terminal 41 connected to a control circuit 37'.

Here, a difference in losses in the optical components is described by making a comparison between the configurations of the conventional technique (shown in FIG. 2) and the present invention (FIG. 5). In the preferred embodiment according to the present invention, a variable optical coupler is used as a method adjusting an optical level. As shown in FIG. 5, the variable optical coupler is arranged in a portion branching to the PD monitor, where an optical coupler whose branch ratio is fixed is used with the conventional technique.

FIGS. 18A and 18B make a comparison between the performance of the preferred embodiment according to the present invention and that of the conventional technique.

Losses in UPin to Pin in the conventional technique and the preferred embodiment according to the present invention are summarized below. Two optical couplers and a variable ATT are used in the conventional technique, whereas one optical coupler and one variable coupler are used in the preferred embodiment according to the present invention. However, their branch losses in the couplers, and the total values of dead losses are almost the same. The loss values are respectively defined as β and γ (approximately 0.6 dB). Additionally, the loss in the variable ATT is defined as α (approximately 1.5 dB to 2.5 dB). As a result, a difference between the conventional technique and the present invention is the loss in the variable ATT: α, and a difference occurs in a node OSNR by the amount of this loss. Namely, as shown in FIG. 18A, the loss becomes small by the amount of the loss in the variable ATT in the preferred embodiment according to the present invention in comparison with the conventional technique. Accordingly, a rise in the NF becomes smaller. Additionally, as shown in FIG. 18B, the OSNR is more improved by the amount of the loss in the variable ATT in the preferred embodiment according to the present invention in comparison with the conventional technique.

Table 4 summarizes the above provided description.

TABLE 4

|  | conventional | | invention | |
| --- | --- | --- | --- | --- |
|  | optical coupler × 2 | variable ATT | vari. cpl. + cpl. | variable ATT |
| branch loss | β | — | β | — |
| dead loss | γ | α | γ | |

Figure 3A:
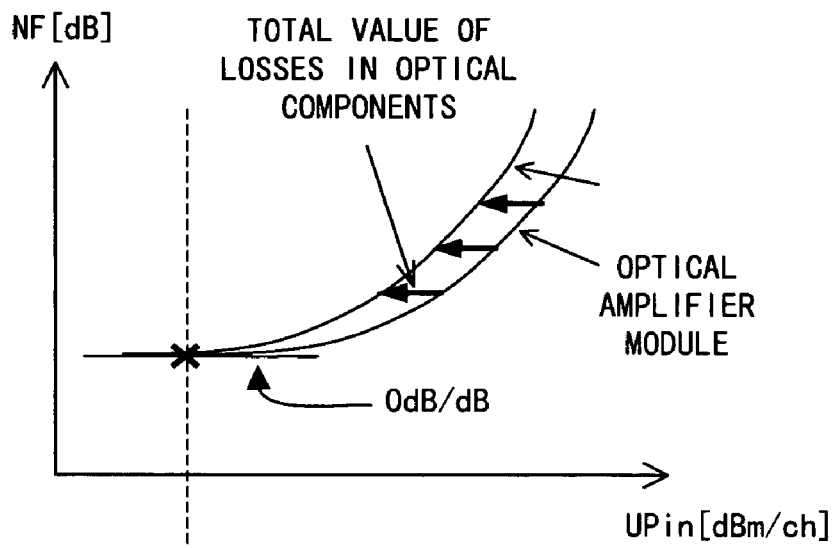
FIGS. 3A and 3B explain the conventional technique (No. 3)
Figure 3B:
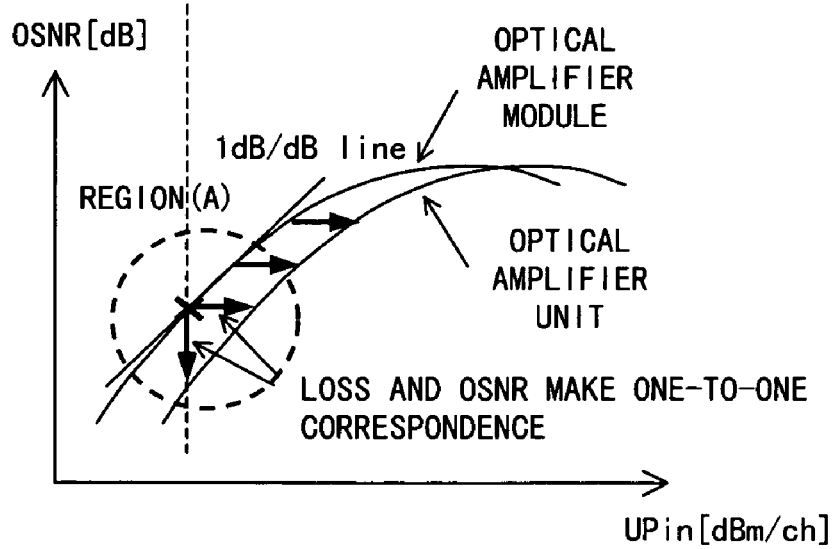

A system whose distance is longer by a difference in the OSNR caused by the loss α in the variable ATT, which is the difference between the conventional technique and the preferred embodiment according to the present invention, can be designed. Specifically, considering a system where the loss in the variable ATT is replaced by a span loss, an improvement by 2.0÷0.2 [dB/km]×15=150 [km] when a loss coefficient is 0.2 [dB/km], and a dead loss is 2.0 [dB] is made for a system having 15 spans. Especially, if the OSNR and the loss make a one-to-one correspondence as in the region (A) shown in FIG. 3B, the amount of the loss in the variable ATT becomes an improvement in the OSNR. Therefore, the number of spans increases by $10^{(2/10)}=1.58$ times. In the case of a transmission system having 15 spans each of which is 100 km, an improvement is made from 1500 [km] to 2520 [km].

Figure 1:
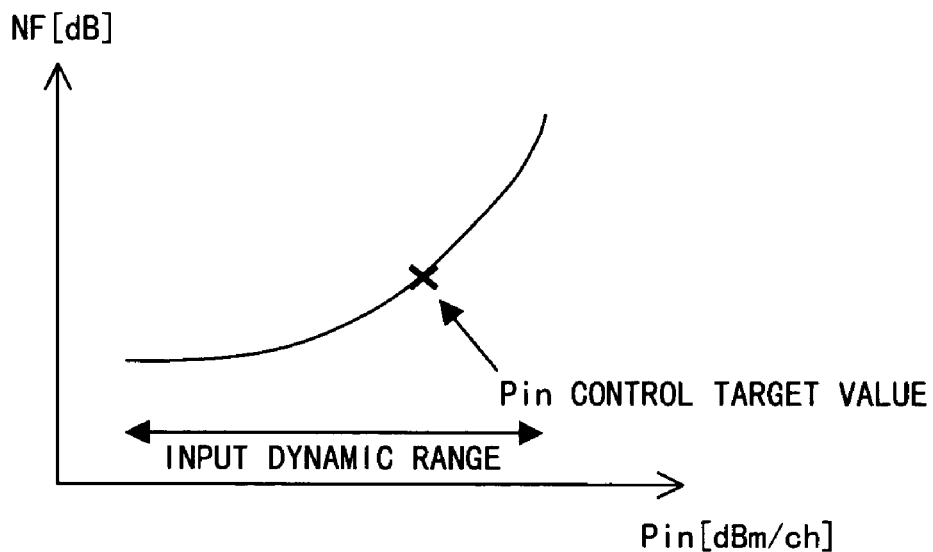
FIGS. 1A and 1B explain a conventional technique (No. 1)
Figure 1:
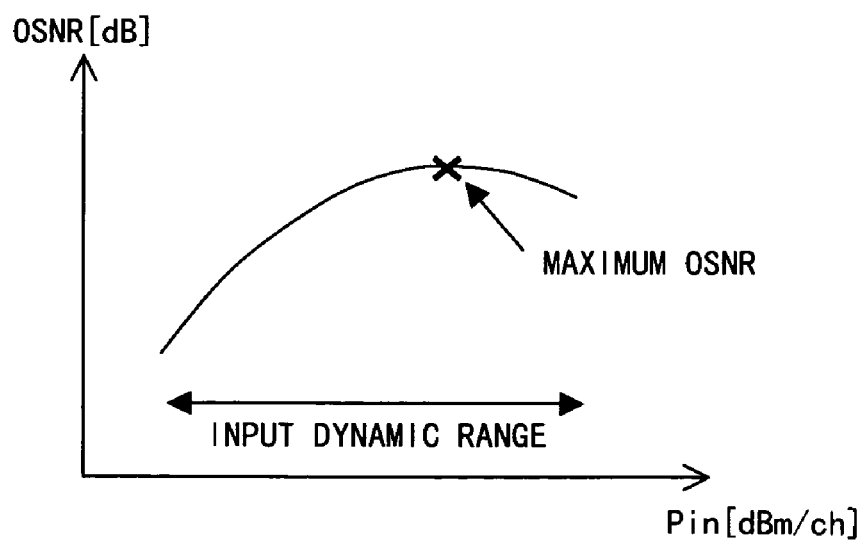

Additionally, for the NF and OSNR characteristics of the optical amplifier unit, which are shown in FIGS. 18A and 18B, an adjustment is implemented to make the input level of the optical amplifier module constant in the optical amplifier unit as described above. Accordingly, the input dynamic range becomes wider in comparison with the module characteristic (FIG. 1). Furthermore, in FIG. 18B, the OSNR is constant in the region (B) unlike in FIGS. 1B and 3B. This is because Pin is set to the control target value that maximizes the OSNR in the optical amplifier unit.

What is claimed is:

1. An optical transmission device, comprising:
    an optical amplifying unit amplifying an optical signal;
    a variable optical branching unit, whose branch ratio can be varied, branching an input to said optical amplifying unit, inputting one to said optical amplifying unit, and supplying another in order to measure an optical intensity; and
    a controlling unit detecting the optical intensity of the another branched by said variable optical branching unit, detecting an optical intensity input to said optical amplifying unit, adjusting an input optical level to said optical amplifying unit by controlling the branch ratio of said variable optical branching unit, and controlling a signal-to-noise ratio of said optical amplifying unit.

2. The optical transmission device according to claim 1, wherein
    a noise component within light input to said optical amplifying unit is estimated, and the branch ratio of said variable optical branching unit is controlled so that an optical signal level output from said optical amplifying unit becomes a target value.

3. The optical transmission device according to claim 1, wherein
    said variable optical branching unit is a coupler that uses electro-optic effects, and can vary the branch ratio.

4. The optical transmission device according to claim 1, wherein
    said variable optical branching unit is a coupler that uses thermo-photo effects, and can vary the branch ratio.

5. The optical transmission device according to claim 1, wherein
    said variable optical branching unit is a coupler that uses MEMS, and can vary the branch ratio.

6. The optical transmission device according to claim 1, wherein
    said variable optical branching unit is a coupler that adopts a configuration of a Mach-Zehnder type.

7. The optical transmission device according to claim 1, wherein
    said variable optical branching unit is a coupler that branches optical power by making cores of transmission lines close, and by causing coupling of modes.

8. The optical transmission device according to claim 1, wherein
    control of the branch ratio of said variable optical branching unit among controls of said controlling unit is manually performed to improve a signal-to-noise ratio obtained by using a result of actually measuring a spectrum of light output from said optical amplifying unit.

9. An optical amplification controlling method, comprising:
    amplifying an optical signal;
    enabling a branch ratio to be varied, branching an input for amplification in said optical amplifying step, using one for the amplification in said optical amplifying step, and supplying another in order to measure an optical intensity; and
    detecting the optical intensity of the another branched by said variable optical branching step, detecting an intensity of an optical input used for the amplification in said optical amplifying step, adjusting an input optical level used for the amplification in said optical amplifying step by controlling the branch ratio in said variable optical branching step, and controlling a signal-to-noise ratio in said optical amplifying step.

* * * * *